(12) United States Patent
Joo et al.

(10) Patent No.: US 11,516,330 B1
(45) Date of Patent: Nov. 29, 2022

(54) HANDS-FREE MODE OPTIMIZATION WITH MULTIPLE DEVICES

(71) Applicants: Hyundai Motor Company, Seoul (KR); Kia Corporation, Seoul (KR)

(72) Inventors: Daesung Joo, SuperiorTownship, MI (US); Jihye Kim, SuperiorTownship, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/483,003

(22) Filed: Sep. 23, 2021

(51) Int. Cl.
*H04M 1/60* (2006.01)
*H04W 36/36* (2009.01)
*H04W 76/15* (2018.01)

(52) U.S. Cl.
CPC ......... *H04M 1/6091* (2013.01); *H04M 1/605* (2013.01); *H04W 36/36* (2013.01); *H04W 76/15* (2018.02)

(58) Field of Classification Search
CPC .................................................. H04M 1/6091
See application file for complete search history.

(56) References Cited

U.S. PATENT DOCUMENTS

| 2003/0032460 A1 | 2/2003 | Cannon et al. |
| 2003/0224840 A1 | 12/2003 | Frank et al. |
| 2005/0277445 A1 | 12/2005 | Bae |
| 2008/0039153 A1* | 2/2008 | Katoh ............... H04M 1/72513 455/569.2 |
| 2013/0275875 A1* | 10/2013 | Gruber ................... G06F 3/167 715/728 |

FOREIGN PATENT DOCUMENTS

WO 2016-032533 A1 3/2016

* cited by examiner

*Primary Examiner* — Hsinchun Liao
(74) *Attorney, Agent, or Firm* — Fox Rothschild LLP

(57) ABSTRACT

Methods and systems are described for coordinating multiple calls across multiple devices. The system includes a communication interface configured to be paired with multiple mobile devices while maintaining concurrent communication with the multiple mobile devices. A controller is configured to connect a microphone and a speaker to the first mobile device via the communication interface to transmit and receive audio in a hands-free mode in response to detecting the first call at the first mobile device. The controller is configured to output a first prompt for selection of whether to continue the first call through the communication interface in the hands-free mode in response to detecting the second call at the second mobile device. The controller is configured to disconnect the microphone and the speaker from the first mobile device in response to receiving a first input indicating a selection of exiting the hands-free mode for the first call.

20 Claims, 11 Drawing Sheets

| Phone Number | Cellular Phone ID | Call Status | Priority Levels 1: Top, 2: Second, 3: Third, 4: Low |
|---|---|---|---|
| 1XXXXXXXX | Phone 1 | The third incoming call | 3 |
| 12XXXXXXX | Phone 2 | The second incoming call | 2 |
| 123XXXXXX | Phone 3 | The first incoming call | 1 |
| 1234XXXXX | Phone 4 | The fourth incoming call | 4 |

FIG. 3A

| Phone Number | Cellular Phone ID | Call Status | Priority Levels 1: Top, 2: Second, 3: Third, 4: Low |
|---|---|---|---|
| 1XXXXXXXX | Phone 1 | The second incoming call | 2 |
| 12XXXXXXX | Phone 2 | The first incoming call | 1 |
| 123XXXXXX | Phone 3 | The third outgoing call | 3 |
| 1234XXXXX | Phone 4 | The fourth incoming call | 4 |

FIG. 3B

HANDS-FREE MODE OPTIMIZATION WITH MULTIPLE DEVICES

TECHNICAL FIELD

The present disclosure relates generally to wireless device communication, and more particularly, to hands-free mode optimization with multiple devices.

BACKGROUND

Cellular devices support pairing with components to wirelessly transfer data. While multiple cellular devices are configured to support pairing, components supporting wireless communication may only pair with one cellular device at a time. For example, a vehicle hands-free unit may pair with a cellular device to enable a hands-free mode. But the vehicle hands-free unit typically pairs with only one cellular device at a time. Since multiple passengers frequently ride together in a vehicle, the multiple passengers may desire to connect their cellular devices to the hands-free unit. But the other passengers may only setup hands-free calling once the vehicle hands-free unit is manually paired to the cellular device and configured to transmit and receive audio with the cellular device. More worrisome, handling multiple calls from multiple cellular devices creates a conflict over which device may use the vehicle hands-free unit.

SUMMARY

The present disclosure provides methods, systems, articles of manufacture, including computer program products, for coordinating multiple calls across multiple devices in a system.

In one aspect, there is provided a system including a communication interface configured to be paired with multiple mobile devices while maintaining concurrent communication with the multiple mobile devices and a controller communicatively coupled to a microphone, a speaker, and the communication interface. The controller is configured to pair a first mobile device of the multiple mobile devices and a second mobile device of the multiple mobile devices to the communication interface. The communication interface is configured to maintain concurrent communication with the first mobile device and the second mobile device. The controller is configured to detect a first call at the first mobile device. Additionally, the controller is configured to connect the microphone and the speaker to the first mobile device via the communication interface to transmit and receive audio in a hands-free mode in response to detecting the first call at the first mobile device. The controller is configured to detect a second call at the second mobile device and in response, output a first prompt for selection of whether to continue the first call through the communication interface in the hands-free mode in response to detecting the second call at the second mobile device. The controller is then configured to disconnect the microphone and the speaker from the first mobile device in response to receiving a first input indicating a selection of exiting the hands-free mode for the first call. The controller is configured to connect the microphone and the speaker to the second mobile device via the communication interface to transmit and receive audio in the hands-free mode.

In some variations, the communication interface maintains concurrent communication with the first mobile device in response to disconnecting the microphone and the speaker from the first mobile device. Additionally, the first prompt is presented at a user interface in the vehicle and the first input is configured to be received at the user interface in the vehicle. In some variations, connecting the microphone and the speaker to the second mobile device is in response to receiving a second input indicating a selection of entering the hands-free mode for the second call, the second input being received at a user interface in the vehicle.

In some variations, the controller is further configured to output a second prompt to determine whether the second call enters the hands-free mode at a user interface in the vehicle in response to disconnecting the microphone and the speaker from the first mobile device. Additionally, the system further comprises a memory, the memory configured to track an order in which calls from the multiple mobile devices are detected in a table while the hands-free mode is in use. In some variations, the hands-free mode enables the microphone and the speaker to send and receive audio from the multiple mobile devices via the communication interface.

Further, the controller is configured to pair a third mobile device to the communication interface, the communication interface configured to maintain concurrent communication with the first mobile device, the second mobile device, and the third mobile device. The controller is configured to detect a third call at the third mobile device. The controller is configured to output a third prompt for selection of whether to continue the second call through the communication interface in the hands-free mode in response to detecting a third call at the third mobile device. The controller is configured to monitor the second call to determine whether the second call is connected to the microphone and the speaker in hands-free mode in response to receiving a third input indicating a selection of continuing the hands-free mode for the second call. The controller is configured to connect the microphone and the speaker to the third mobile device via the communication interface to transmit and receive audio in the hands-free mode in response to determining the second call is disconnected from the microphone and the speaker in the hands-free mode.

In some variations, connecting the microphone and the speaker to the third mobile device is in response to receiving the third input indicating a selection of entering the hands-free mode for the third call, the third input being received at a user interface in the vehicle. Additionally, the controller may be configured to output a fourth prompt to determine whether the third call enters the hands-free mode at a user interface in the vehicle in response to determining the second call is disconnected from the microphone and the speaker in the hands-free mode. Additionally, the controller is further configured to determine whether the multiple mobile devices are in at least one of a standby mode, receiving an incoming call, making an outgoing call, and ready for a call connection. The first call at the first mobile device is at least one of a first inbound call and a first outbound call.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein.

Computer-implemented methods consistent with one or more implementations of the current subject matter may be implemented by one or more data processors residing in a single computing system or multiple computing systems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3A depicts a table illustrating call priority across multiple mobile devices communicatively coupled to the vehicle hands-free unit;

FIG. 3B depicts another example of a table illustrating call priority across multiple mobile devices communicatively coupled to the vehicle hands-free unit;

DETAILED DESCRIPTION

Figure 1:
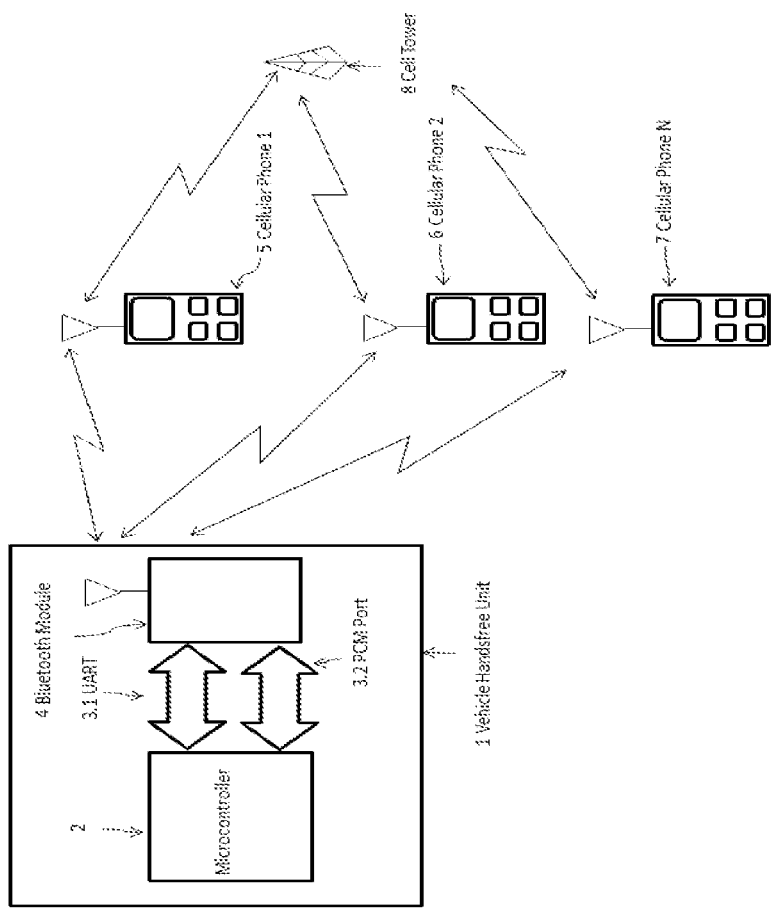
FIG. 1 depicts a block diagram illustrating the interface between a vehicle hands-free unit and the multiple mobile devices.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present embodiments may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

According to the present disclosure, a system may coordinate multiple calls across multiple mobile devices in a vehicle. The system solves the technical problem of coordinating the activity of multiple incoming/outgoing calls across multiple devices communicatively coupled to a hands-free unit. Unlike other systems, the system may pair with multiple devices and maintain concurrent communication with multiple devices even when the devices are not transmitting and receiving audio through the hands-free unit. To solve the problems of multiple call activity, the hands-free unit may use a prioritization table to manage incoming/outgoing calls among the paired mobile devices. For example, the mobile device with the first incoming/outgoing call has the first opportunity to use the hands-free unit. The next mobile device with the second incoming/outgoing call has the next opportunity to use the hands-free unit if the first incoming/outgoing call ends or enters a private mode. This prioritization table provides a timely transition between calls across multiple mobile devices and handles multiple requests to use the hands-free unit across multiple mobile devices.

The system may include a communication interface configured to be paired with multiple mobile devices while maintaining concurrent communication with multiple mobile devices. The system may include a controller communicatively coupled to a microphone, a speaker, and the communication interface. The controller may be configured to pair a first mobile device of the multiple mobile devices and a second mobile device of the multiple mobile devices to the communication interface. The communication interface may be configured to maintain concurrent communication with the first mobile device and the second mobile device. The controller may detect a first call at the first mobile device. The controller may be configured to connect the microphone and the speaker to the first mobile device via the communication interface to transmit and receive audio in a hands-free mode in response to detecting the first call at the first mobile device.

The controller may be configured to detect a second call at the second mobile device. The controller may be configured to output a first prompt for selection of whether to continue the first call through the communication interface in the hands-free mode. The controller may be configured to disconnect the microphone and the speaker from the first mobile device in response to receiving a first input indicating a selection of exiting the hands-free mode for the first call. The controller may be configured to connect the microphone and the speaker to the second mobile device via the communication interface to send and receive audio in the hands-free mode.

The communication interface may be configured to maintain concurrent communication with the first mobile device in response to disconnecting the microphone and the speaker from the first mobile device. The first prompt may be presented at a user interface in the vehicle and the first input may be configured to be received at the user interface in the vehicle. Connecting the microphone and the speaker to the second mobile device may be in response to receiving a second input indicating a selection of entering the hands-free mode for the second call, the second input being received at a user interface in the vehicle.

The system may be configured to update a prioritization table in response to detecting the incoming/outgoing calls across the multiple mobile devices. The prioritization table may be stored in a memory. The memory may be configured to track an order in which calls from the multiple mobile devices are detected in a table while the hands-free mode is in use. The controller may be configured to output a second prompt to determine whether the second call enters the hands-free mode at a user interface in the vehicle in response to disconnecting the microphone and the speaker from the first mobile device. The hands-free mode may enable the microphone and the speaker to send and receive audio from the multiple mobile devices via the communication interface.

The methods, systems, apparatuses, and non-transitory storage mediums described herein optimize the hands-free unit with multiple devices in a vehicle hands-free unit. The various embodiments may also utilize a prioritization table to provide a timely transition between calls across multiple mobile devices and handle multiple requests to use the hands-free unit across multiple mobile devices.

FIG. 1 depicts a block diagram illustrating the interface between a vehicle hands-free unit and the multiple mobile devices. The controller at the hands-free unit may be communicatively coupled to the multiple mobile devices. The multiple mobile devices may be communicatively coupled to a cell tower. The controller may be communicatively coupled to a memory storing instructions related to coordinating multiple calls across multiple mobile devices with the hands-free unit.

The hands-free unit may include a controller, a memory, and a communication interface. The hands-free unit may be coupled to a microphone and a speaker in the vehicle. The hands-free unit may be configured to connect the microphone and the speaker to the mobile devices via the communication interface. The controller may enable and disable the voice signal to and from the communication interface via the PCM port. The controller may be configured to send and receive packet data from the communication interface via UART. The hands-free unit may be configured to coordinate multiple calls across multiple mobile devices with the hands-free unit. The controller may be configured to detect incoming/outgoing calls through the communication interface.

The communication interface may be paired with multiple mobile devices while maintaining concurrent communication with the multiple mobile devices. The communication interface may be a Bluetooth interface or a similar wireless communication interface. The communication interface may be configured to transmit and receive audio in a hands-free mode from the multiple mobile devices.

Figure 2:
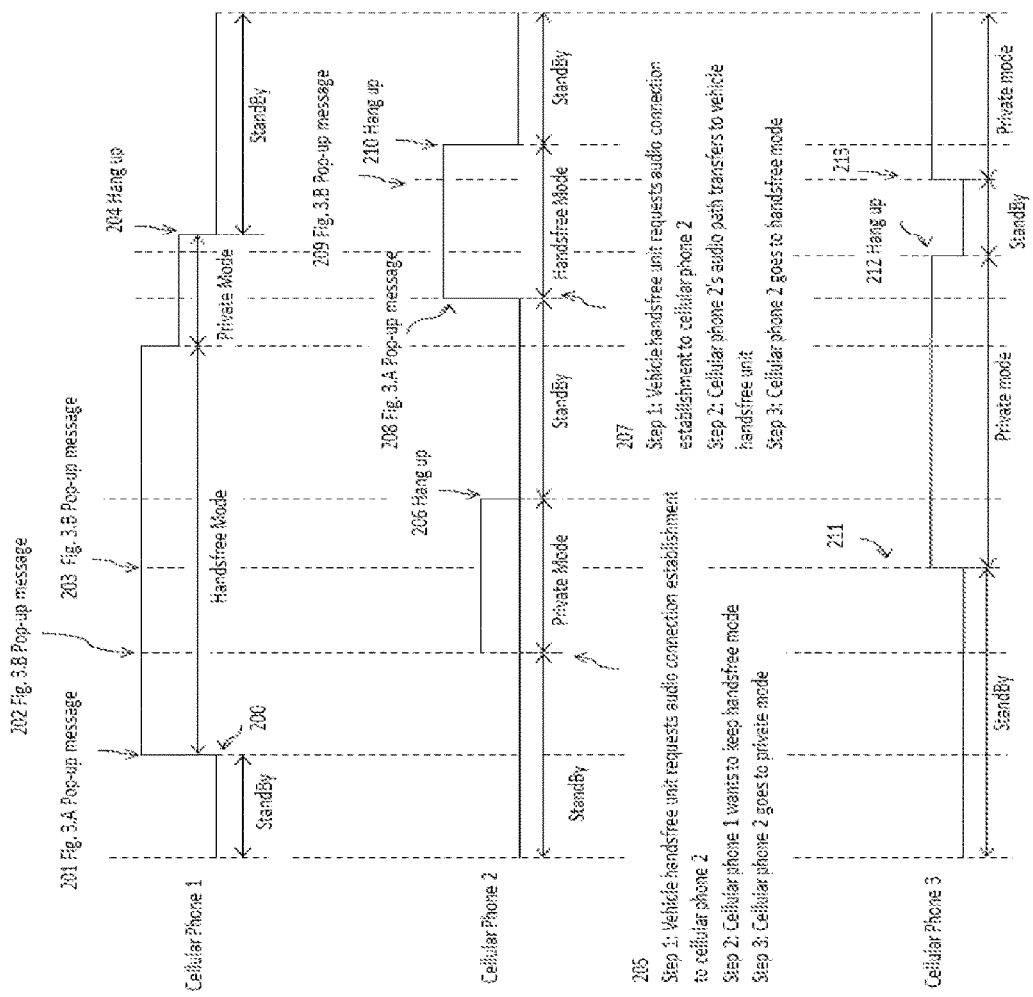
FIG. 2 shows a diagram illustrating how the vehicle hands-free unit coordinates multiple calls across multiple mobile devices.

FIG. 2 depicts an example of a signal diagram for controlling fuel and air delivered to a combustion chamber.

At 201, the hands-free unit may be configured to display a pop-up message at a user interface within the vehicle in response to a mobile device having an incoming/outgoing call at 200. The pop-up message may include the status of the first mobile device in a hands-free mode. The user interface may be configured to detect a selection for connecting the first mobile device to the hands-free unit.

At 202, the hands-free unit may be configured to output a prompt in response to the second mobile device receiving an incoming/outgoing call. The hands-free unit may be configured to output a prompt for selection of whether to continue the first call through the communication interface in the hands-free mode. Additionally, and/or alternatively, the hands-free unit may output the prompt at the mobile device. The hands-free unit may be configured to receive an input indicating a selection of continuing the hands-free mode for the first call. As a result, the second call at the second mobile device may enter a private mode as the first mobile device continues in hands-free mode.

At 203, the hands-free unit may be configured to output a prompt (e.g., a first prompt) in response to the third mobile device receiving an incoming/outgoing call. The hands-free unit may be configured to output another prompt (e.g., a second prompt) for selection of whether to continue the first call through the communication interface in the hands-free mode at the user interface. Additionally, and/or alternatively, the hands-free unit may be configured to output the prompt at the mobile device. The hands-free unit may be configured to receive an input indicating a selection of continuing the hands-free mode for the first call. As a result, the third call at the second mobile device may enter a private mode as the first mobile device continues in hands-free mode.

At 206, the hands-free unit may be configured to receive a status update from the second mobile device indicating that the second mobile device is in a standby mode after releasing a call.

At 208, hands-free unit may be configured to output a prompt in response to the second mobile device receiving an incoming/outgoing call. The hands-free unit may be configured to output a prompt for selection of whether to enter the hands-free mode for the second call in response to detecting that the first call at the first mobile device has entered a private mode. Additionally, and/or alternatively, the hands-free unit may be configured to output the prompt at the mobile device. The hands-free unit may be configured to receive an input indicating a selection of entering the hands-free mode for the second call. As a result, the second call at the second mobile device may enter the hands-free mode.

At 209, the hands-free unit may be configured to output a prompt in response to the third mobile device receiving an incoming/outgoing call. The hands-free unit may be configured to output another prompt at the user interface for selection of whether to continue the second call through the communication interface in the hands-free mode. Additionally, and/or alternatively, the prompt may be output at the mobile device. The hands-free unit may be configured to receive an input indicating a selection of continuing the hands-free mode for the second call. As a result, the third call at the third mobile device may enter a private mode as the second mobile device continues in hands-free mode.

In some embodiments, the hands-free unit may be configured to pair a third mobile device to the communication interface. The communication interface may be configured to maintain concurrent communication with the first mobile device, the second mobile device, and the third mobile device. The hands-free unit may be configured to detect a third call at the third mobile device. The hands-free unit may be configured to output a third prompt for selection of whether to continue the second call through the communication interface in the hands-free mode in response to detecting a third call at the third mobile device.

The hands-free unit may be configured to monitor the second call to determine whether the second call is connected to the microphone and the speaker in a hands-free mode in response to receiving a third input indicating a selection of continuing the hands-free mode for the second call. The hands-free unit may be configured to connect the microphone and the speaker to the third mobile device via the communication interface to send and receive audio in the hands-free mode in response to determining the second call is disconnected from the microphone and the speaker in the hands-free mode.

Particularly, the connecting of the microphone and the speaker to the third mobile device may be performed in response to receiving the third input indicating a selection of entering the hands-free mode for the third call, the third input being received at a user interface in the vehicle. The hands-free unit may be configured to output a fourth prompt to determine whether the third call enters the hands-free mode at a user interface in the vehicle in response to determining the second call is disconnected from the microphone and the speaker in the hands-free mode.

FIG. 3A depicts an example of a prioritization table illustrating call priority across multiple mobile devices communicatively coupled to the vehicle hands-free unit. The prioritization table may be located in the memory inside vehicle hands-free unit. The prioritization table may track the call status of each mobile device. The mobile devices may register with the hands-free table for tracking by the prioritization table.

The prioritization table may include a phone number, cellular phone ID, call status, and priority level. The phone number, cellular phone ID, and call status may be obtained via the communication interface from the mobile devices. The prioritization table may track the multiple phone calls from the mobile devices in a priority level field. The priority level field may determine the order in which the mobile device may gain access to the hands-free unit relative to the other mobile devices. The controller may be configured to update the priority level fields as calls are released from the mobile devices. Additionally, the controller may be configured to update the priority level fields as calls are received by the mobile devices.

For example, the third mobile device may be configured to receive the first incoming call. The third mobile device may have the first priority to access the hands-free calling feature due to receiving the first incoming call. The fourth mobile device may be configured to receive the fourth incoming call and, accordingly, have the lowest priority in the prioritization table.

FIG. 3B depicts another example of a table illustrating call priority across multiple mobile devices communicatively coupled to the vehicle hands-free unit. The prioritization table may be located in the memory inside vehicle hands-free unit. The prioritization table may track the call status of each mobile device. The mobile devices may register with the hands-free table for tracking by the prioritization table.

In this example, the second mobile device may be configured to receive the first incoming call. The second mobile device may have the first priority (Priority Level 1) to access the hands-free unit since the second mobile device received the first incoming call. The fourth mobile device may be configured to receive the fourth incoming call (Priority Level 4) and, accordingly, have the lowest priority in the prioritization table. The prioritization table may enable the hands-free unit to track which mobile device is eligible to enter the hands-free mode after the current mobile device releases its call from the hands-free mode. Releasing a call from the hands-free unit may include ending the call or transferring the call to a private mode.

The prioritization table may update the call status of the mobile devices as different devices release calls (i.e., call activity changes). For example, during the first incoming call at the second mobile device with the hands-free unit, the second incoming call may be received at the first mobile device. Then, the third mobile device may be configured to receive the third incoming call. The second incoming call at the first mobile device may be released during the first incoming call. In other words, the second call at the first mobile device may end prior to the first call at the second mobile device. The first mobile device may be configured to notify the hands-free unit that the second call at the second mobile device is released and that the first mobile device is now on standby mode. In response to receiving a standby mode status from the first mobile device, the controller may be configured to update the priority level of the third mobile device. Accordingly, the priority level of the third mobile device may be updated to priority level 2.

Figure 4B:
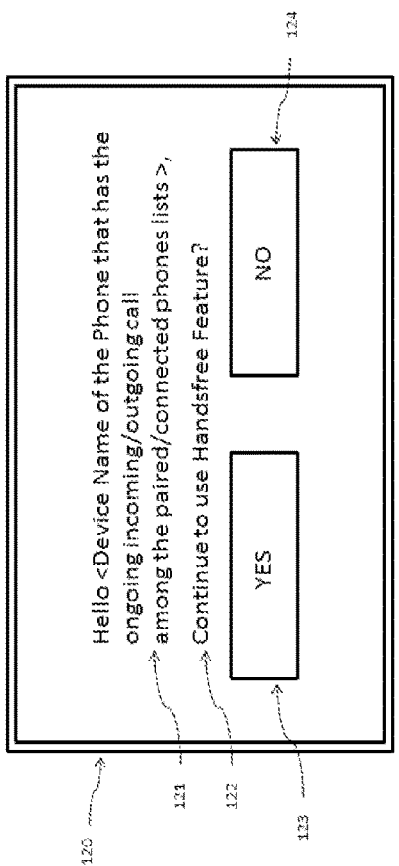
FIG. 4B depicts an example of a prompt for selection of whether to continue the first call through the communication interface in the hands-free mode.
Figure 4A:
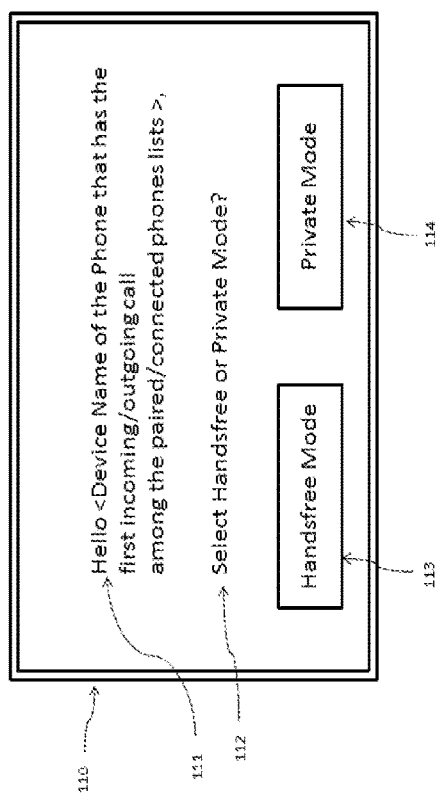
FIG. 4A depicts an example of a prompt for selection of whether to receive the first call through the communication interface in the hands-free mode.

FIG. 4A depicts an example of a prompt for selection of whether to receive the first call through the communication interface in the hands-free mode. A pop-up message may prompt a selection of entering the hands-free mode to allow the mobile device that currently has the first incoming/ outgoing call to select either hands-free mode or private mode. The pop-up message may appear on the user interface in the vehicle or on the mobile user interface. If the user does not select either hands-free mode or Private Mode, the hands-free unit may be configured to automatically transfer the mobile device to Private Mode after a predetermined amount of time has passed. In response to selecting the hands-free mode, the hands-free unit may be configured to request an audio connection and execute audio connection establishment with the mobile device. This audio connection may include connecting the vehicle microphone and the vehicle speaker to the first mobile device via the communication interface to transmit and receive audio in the hands-free mode FIG. 4B depicts an example of a prompt for selection of whether to continue the first call through the communication interface in the hands-free mode. In response to a second mobile device initiating an incoming/outgoing call, another pop-up message may prompt selection of continuing the hands-free mode with the first mobile device through the communication interface in the hands-free mode. The pop-up message may appear on the user interface in the vehicle or on the mobile user interface.

If the user selects "NO", the hands-free device receives an input indicating a selection of exiting the hands-free mode with the first mobile device. As a result, the hands-free unit may disconnect the first mobile device from the microphone and speaker connected to the hands-free device. Additionally, the hands-free unit may connect the second mobile device to the vehicle microphone and the vehicle speaker via the communication interface. If the user selects "YES", the hands-free device continues the call in the hands-free mode and the second call at the second mobile device enters or remains in a private mode. If neither option is selected, the hands-free device continues the call in the hands-free mode and the second call at the second mobile device enters or remains in a private mode.

Figure 5:
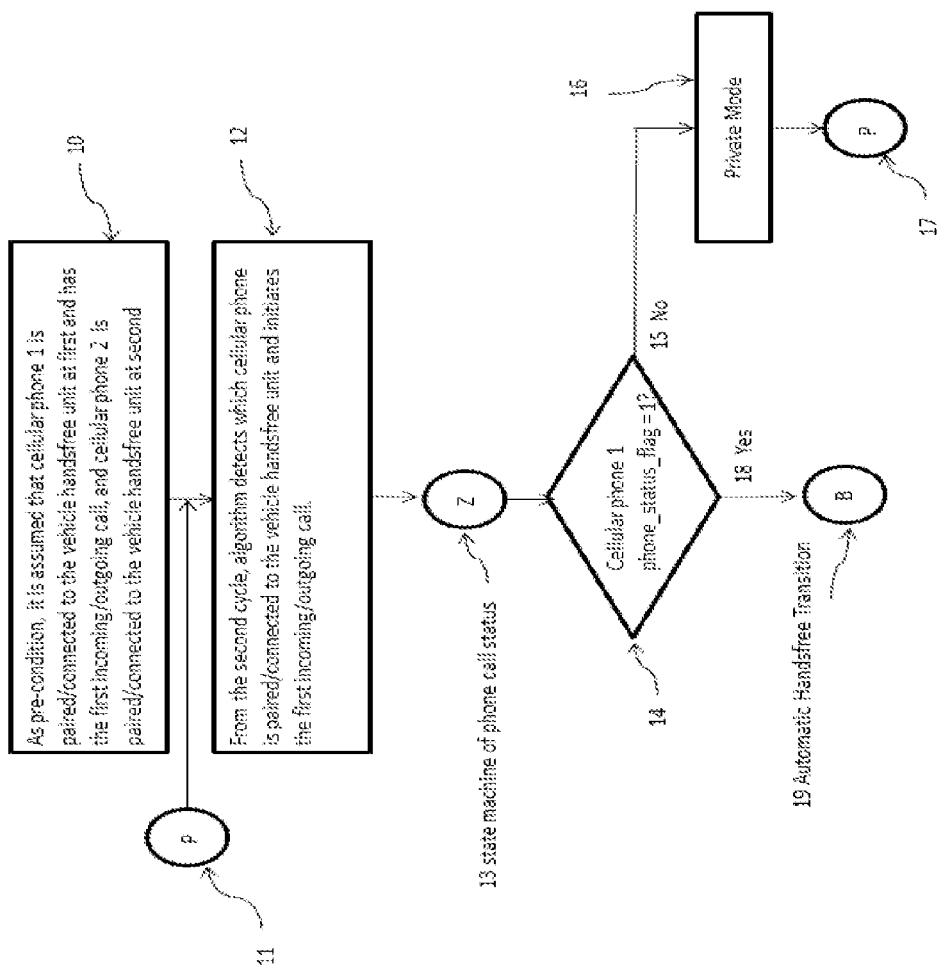
FIG. 5 depicts a flowchart illustrating a method of how the vehicle hands-free unit coordinates multiple calls across multiple mobile devices.

FIG. 5 depicts an example of a flowchart illustrating how the vehicle hands-free unit coordinates multiple calls across multiple mobile devices. The hands-free unit may operate as a state machine in monitoring the phone call status of each of the devices and controlling access to the hands-free mode of the vehicle.

In 10, the first mobile device may be paired to the hands-free unit after the first incoming/outgoing call being initiated. Additionally, the second mobile device may be paired to the hands-free unit. In 12, the controller may be configured to detect which mobile device is paired to the hands-free unit and has the first incoming/outgoing call. The call status of the mobile devices may be "Standby", "Incoming Call Process", "Outgoing Call Process", and "Call Connection Ready." The controller may be configured to monitor the phone call status of the mobile devices.

In 14, the controller may be configured to detect the phone call status of the mobile devices. For example, the controller may be configured to determine whether the phone call status of the mobile device is equal to 1. A phone call status of 1 may mean that the mobile is "Call Connection Ready." In this state, the mobile device may enter automatic hand free transition to the hands-free mode via the communication interface in response to initiating a phone call.

Figure 6:
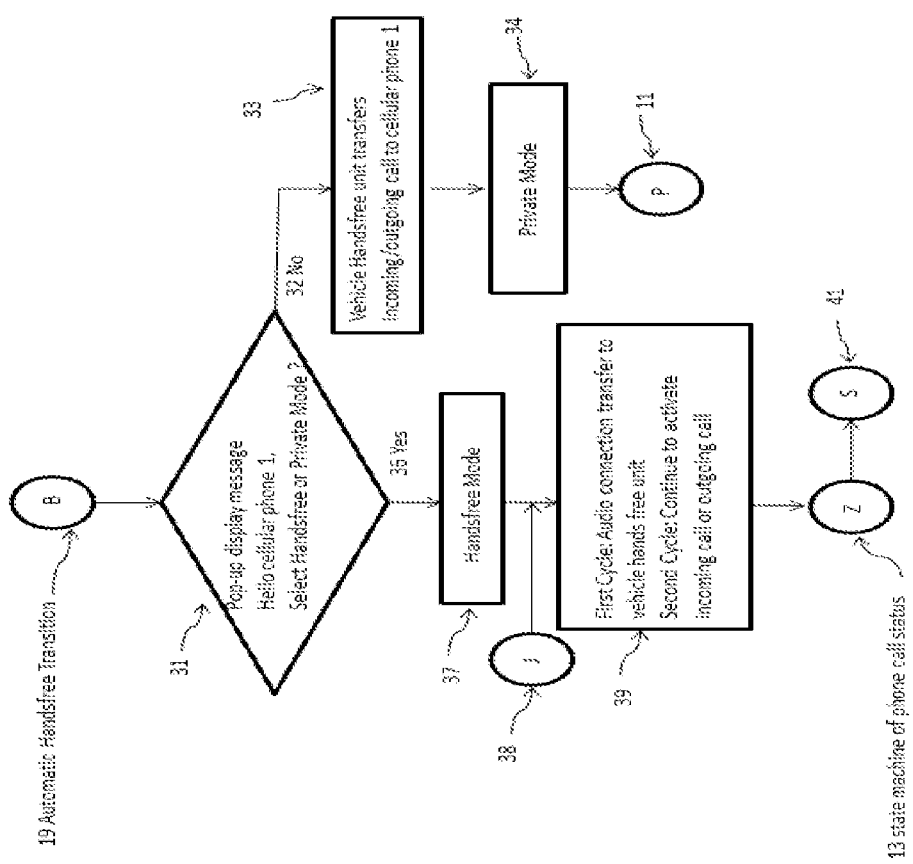
FIG. 6 depicts another flowchart illustrating a method of how the vehicle hands-free unit coordinates multiple calls across multiple mobile devices.

FIG. 6 depicts an example of another flowchart illustrating how the vehicle hands-free unit coordinates multiple calls across multiple mobile devices. The hands-free unit may operate as a state machine in monitoring the phone call status of each of the devices and controlling access to the hands-free mode of the vehicle. The first call at the first mobile device may be at least one of a first inbound call and a first outbound call.

In 31, the hands-free unit may be configured to output a pop-up message to verify the first mobile device is to enter the hands-free mode. The pop-up message may prompt the user to select whether to enter the first call through the communication interface in the hands-free mode. If the user selects "private mode", the hands-free unit may be configured to transfer the incoming/outgoing call to the mobile device in a private mode. If the user selects "hands-free", the hands-free unit may connect the microphone and the speaker to the mobile device via the communication interface to send and receive audio in the hands-free mode.

At 34, the incoming/outgoing call may be in the private mode at the mobile device. Until the phone call status at the mobile device is "call connection ready", the mobile device may remain in the private mode. At 39, the hands-free unit may connect the microphone and the speaker to the mobile device via the communication interface to transmit and receive audio in the hands-free mode. The call at the mobile device in hands-free mode may be continuously activated through voice communication channel. Additionally, the call at the mobile device in hands-free mode may be routinely checked to determine if the hands-free unit may connect the microphone and the speaker to another mobile device for another incoming/outgoing call. At 41, the hands-free unit checks if another mobile device triggers an incoming/outgoing call process.

Figure 7:
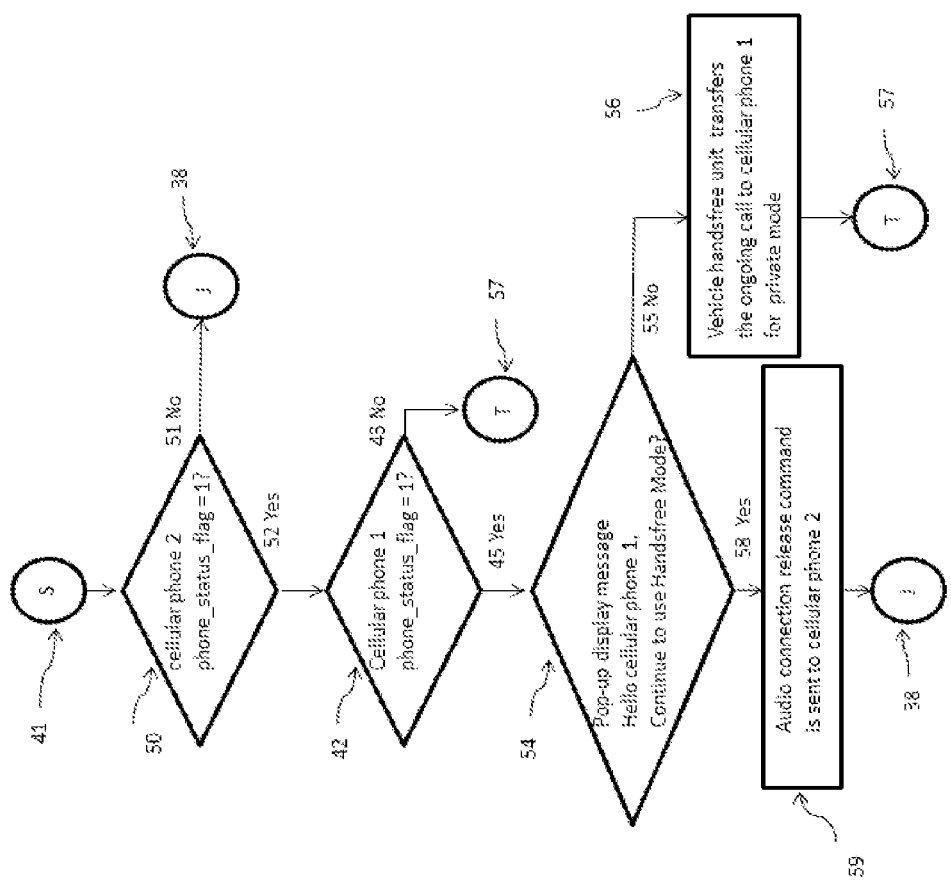
FIG. 7 depicts another flowchart illustrating a method of how the vehicle hands-free unit coordinates multiple calls across multiple mobile devices.

FIG. 7 depicts an example of another flowchart illustrating how the vehicle hands-free unit coordinates multiple calls across multiple mobile devices. The hands-free unit may operate as a state machine in monitoring the phone call status of each of the devices and controlling access to the hands-free mode of the vehicle. At 41, the hands-free unit checks if another mobile device initiates an incoming/outgoing call process.

In 50, the hands-free unit may be configured to check whether the second mobile device is in the "Call Connection Ready" status. For example, if the phone call status of the second mobile device is 0, the first mobile device may maintain its call in the hands-free mode. But if the phone call status of the second mobile device is 1, the hands-free unit may be configured to output a pop-up message. Outputting the message may be based on the phone call status of the first mobile device being 1, which indicates that the first mobile device is call connection ready.

In 54, the hands-free unit may be configured to generate an output message in response to a mobile device being in a call connection ready status. The output message may prompt the user for selection of whether to continue the first call at the first mobile device through the communication interface in the hands-free mode. For example, the hands-free unit may be configured to output a pop-up message stating "Hello cellular phone 1, Continue to use Hands-free mode?". If the hands-free unit receives a "NO" selection, the first mobile device may enter a private mode. Accordingly, the second mobile device may have the opportunity to enter the hands-free mode. If the hands-free unit receives a "YES" selection, the hands-free device may continue the call in the hands-free mode and the second call at the second mobile device may enter or remain in a private mode. Additionally, the audio connection with the hands-free unit may be released. If neither option is selected, the hands-free device may continue the call in the hands-free mode and the second call at the second mobile device enters or remains in a private mode.

Figure 8:
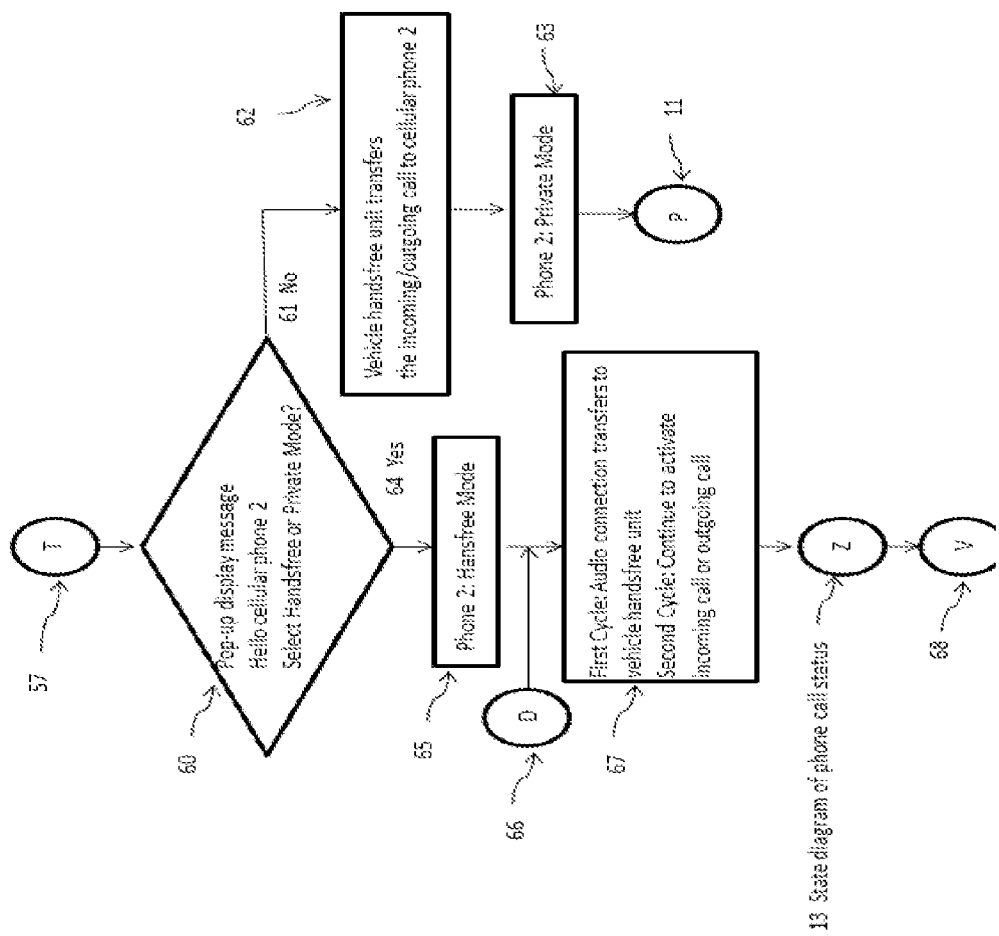
FIG. 8 depicts another flowchart illustrating a method of how the vehicle hands-free unit coordinates multiple calls across multiple mobile devices.

FIG. 8 depicts an example of another flowchart illustrating how the vehicle hands-free unit coordinates multiple calls across multiple mobile devices. The hands-free unit may operate as a state machine in monitoring the phone call status of each of the devices and controlling access to the hands-free mode of the vehicle.

At 60, the hands-free unit may be configured to generate an output message in response to a mobile device being in a call connection ready status. The output message may prompt for selection of whether to continue the first call at the first mobile device through the communication interface in the hands-free mode. For example, the hands-free unit may be configured to output a pop-up message stating, "Hello cellular phone 2, Select Hands-free or Private Mode" on a user interface in the vehicle.

In 61, if the selection is "NO" in response to the output message, the second mobile device may enter a private mode. Otherwise, in step 64, if the selection is "YES", the hands-free unit receives an input indicating a selection of entering the hands-free mode for the second mobile device. In 67, the vehicle hands-free unit may establish an audio connection on the first cycle. For example, the hands-free unit may connect the microphone and the speaker to the mobile device via the communication interface to transmit and receive audio in the hands-free mode. The hands-free unit may continuously activate the call on the second cycle.

In 13, the hands-free unit may check the call status of the mobile devices. If a mobile device requests an audio connection establishment with the vehicle hands-free unit, the requesting mobile device may be provided an opportunity for to transfer to hands-free mode from the second mobile device to the requesting mobile device.

Figure 9:
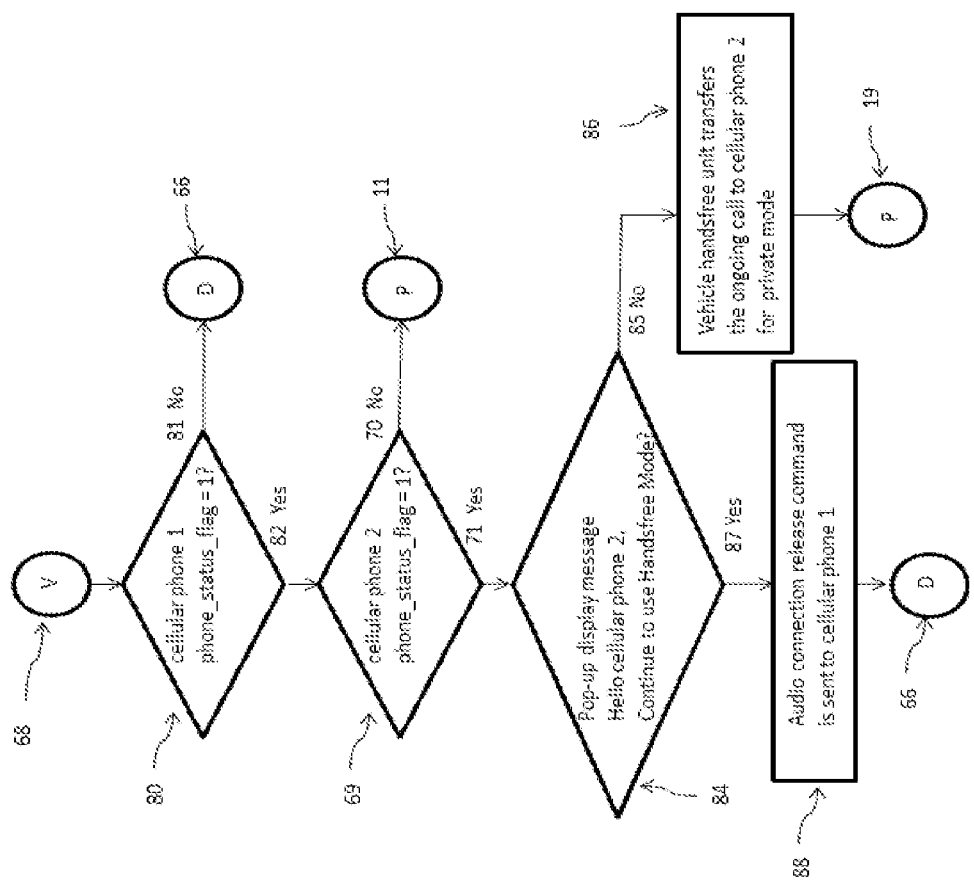
FIG. 9 depicts another flowchart illustrating a method of how the vehicle hands-free unit coordinates multiple calls across multiple mobile devices.

FIG. 9 depicts an example of another flowchart illustrating how the vehicle hands-free unit coordinates multiple calls across multiple mobile devices. The hands-free unit may operate as a state machine in monitoring the phone call status of each of the devices and controlling access to the hands-free mode of the vehicle.

In 80, the hands-free unit may be configured to check whether the first mobile device is in "Call Connection Ready" status. For example, if the phone call status of the first mobile device is 0, the second mobile device maintains its call in the hands-free mode. But if the phone call status of the first mobile device is 1, the hands-free unit may be configured to output a pop-up message. Outputting the message may be based on the phone call status of the second mobile device being 1, indicating that the second mobile device is call connection ready.

In 85, the hands-free unit may be configured to generate an output message in response to a mobile device being in a call connection ready status. The output message may prompt for selection of whether to continue the call at the second mobile device through the communication interface in the hands-free mode. For example, the hands-free unit may be configured to output a pop-up message stating "Hello cellular phone 2, Continue to use Hands-free mode?". If the hands-free unit receives a "NO" selection, the first mobile device may enter a private mode. As such, the first mobile device (or the next mobile device having priority according to the prioritization table) may have the opportunity to enter the hands-free mode. The vehicle hands-free unit may check which mobile devices are connected and give the opportunity to connect to the next mobile device having priority.

In 87, if the hands-free unit receives a "YES" selection, the hands-free device continues the call in the hands-free mode and the call at the first mobile device enters or remains in a private mode. Additionally, the audio connection with the hands-free unit may be released. If neither option is selected, the hands-free device may continue the call in the hands-free mode and the call at the first mobile device enters or remains in a private mode.

Figure 10:
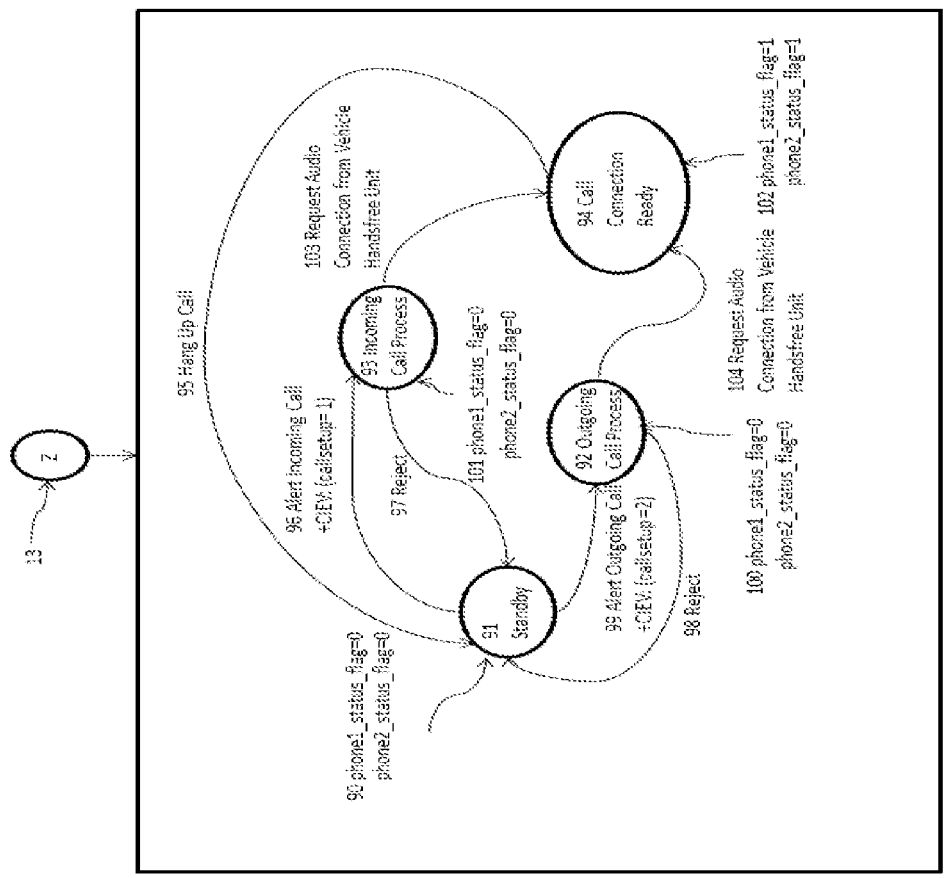
FIG. 10 depicts a state diagram of cellular phone call status.

FIG. 10 depicts an example of a flowchart illustrating a state diagram of cellular phone call status. The hands-free unit may operate as a state machine in monitoring the phone call status of each of the devices and controlling access to the hands-free mode of the vehicle. The states or statuses of the state machine may be "Standby", "Incoming Call Process", "Outgoing Call Process" and "Call Connection Ready." Additionally, the controller is further configured to determine whether the multiple mobile devices are in at least one of a standby mode, receiving an incoming call, making an outgoing call, and ready for a call connection.

At 91, "Standby" may indicate the cellular phone status flag is 0, which means that the call is rejected or disconnected. If the hands-free unit receives a callsetup=2, the call status may transition from standby to "Outgoing Call Process" at 92. Similarly, if the hands-free unit receives a callsetup=1, the call status may transition from standby to "Incoming Call Process" at 93. In either case, the phone call status flag may be at 0 to transition to either process. At 94, the hands-free unit may be configured to transfer the call status to "Call Connection Ready" 94 whenever audio connection request is requested from vehicle hands-free unit. When a call is rejected or disconnected (hanged up), the phone call status may transition to "Standby" 91.

Figure 11:
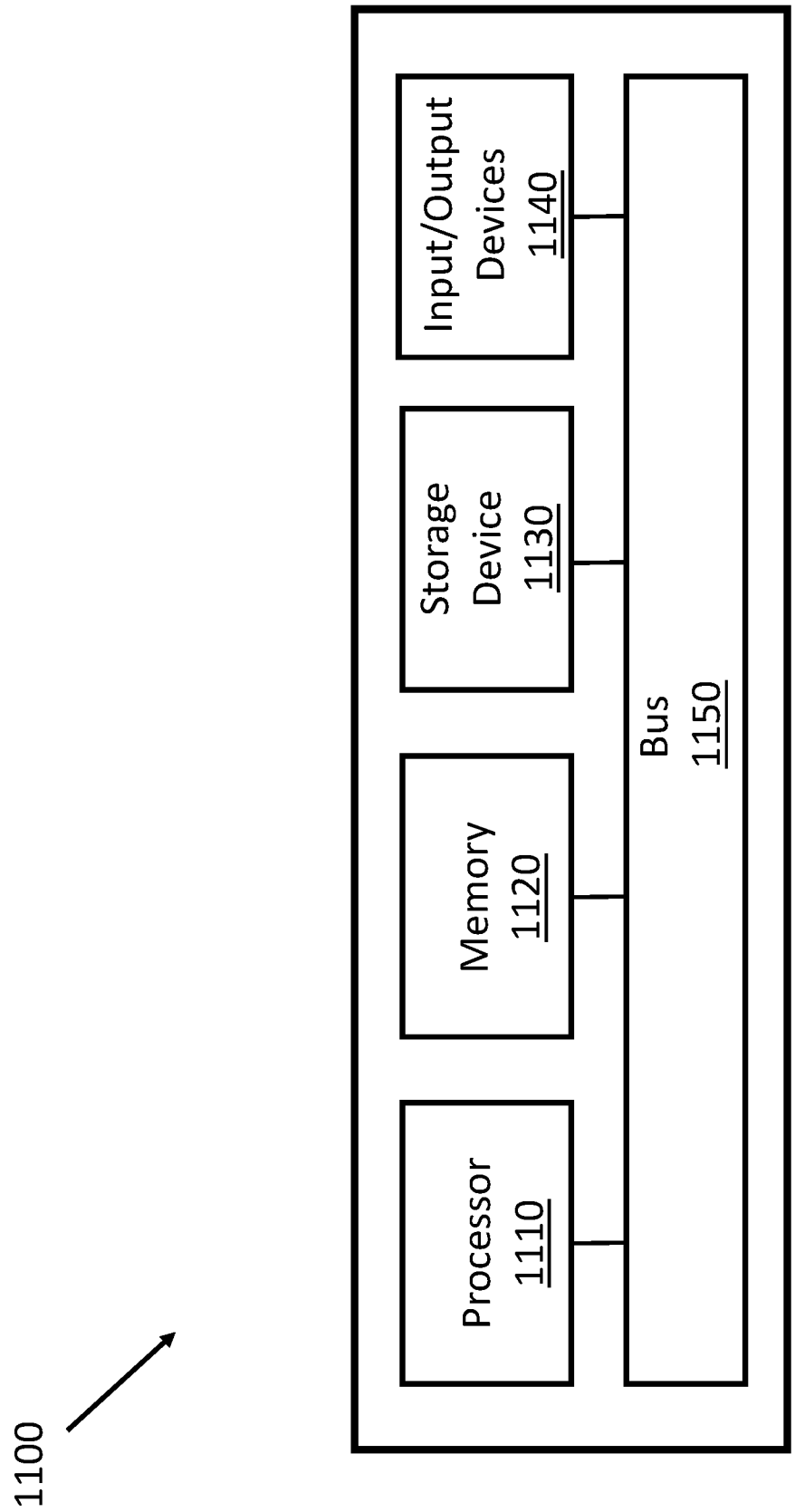
FIG. 11 depicts a block diagram illustrating a computing system consistent with implementations of the current subject matter.

FIG. 11 depicts a block diagram illustrating a computing system 1000 consistent with implementations of the current subject matter. Referring to FIGS. 1-11, the computing system 1100 may be used to coordinate multiple calls across multiple mobile devices in a vehicle. For example, the computing system 1100 may implement a user equipment, a personal computer, or a mobile device.

As shown in FIG. 11, the computing system 1100 may include a processor 1110, a memory 1120, a storage device 1130, and an input/output device 1140. The processor 1110, the memory 1120, the storage device 1130, and the input/output device 1140 may be interconnected via a system bus 1150. The processor 1110 is capable of processing instructions for execution within the computing system 1100. Such executed instructions may implement one or more components of, for example, the hands-free unit. In some example embodiments, the processor 1110 may be a single-threaded processor. Alternately, the processor 1110 may be a multi-threaded processor. The processor 1110 is capable of processing instructions stored in the memory 1120 and/or on the storage device 1130 to display graphical information for a user interface provided via the input/output device 1140.

The memory 1120 is a non-transitory computer-readable medium that stores information within the computing system 1100. The memory 1120 may be configured to store data structures representing configuration object databases, for example. The storage device 1130 is capable of providing persistent storage for the computing system 1100. The storage device 1130 may be a floppy disk device, a hard disk device, an optical disk device, or a tape device, or other suitable persistent storage means. The input/output device 1140 provides input/output operations for the computing system 1100. In some example embodiments, the input/output device 1140 includes a keyboard and/or pointing device. In various implementations, the input/output device 1140 includes a display unit for displaying graphical user interfaces.

According to some example embodiments, the input/output device 1140 may provide input/output operations for a network device. For example, the input/output device 1140 may include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 1100 may be used to execute various interactive computer software applications that may be used for organization, analysis and/or storage of data in various formats. Alternatively, the computing system 1100 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing items and/or functionalities. Upon activation within the applications, the functionalities may be used to generate the user interface provided via the input/output device 1140. The user interface may be generated and presented to a user by the computing system 1100 (e.g., on a computer screen monitor, etc.).

The system solves the technical problem of coordinating the activity of multiple incoming/outgoing calls across multiple devices communicatively coupled to a hands-free unit. Unlike other systems, the system may pair with multiple devices and maintain concurrent communication with the multiple devices even when the devices are not transmitting and receiving audio through the hands-free unit. To solve the problems of multiple call activity, the hands-free unit may use a prioritization table to manage incoming/outgoing calls among the paired mobile devices. For example, the mobile device with the first incoming/outgoing call has the first opportunity to use the hands-free unit. The next mobile device with the second incoming/outgoing call has the next opportunity to use the hands-free unit if the first incoming/outgoing call ends or enters a private mode. This prioritization table provides a timely transition between calls across multiple mobile devices and handles multiple requests to use the hands-free unit across multiple mobile devices.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system for coordinating multiple calls across multiple mobile devices in a vehicle, the system comprising:
    a communication interface configured to be paired with multiple mobile devices while maintaining concurrent communication with the multiple mobile devices; and
    a controller communicatively coupled to a microphone, a speaker, and the communication interface, the controller configured to:
        pair a first mobile device of the multiple mobile devices and a second mobile device of the multiple mobile devices to the communication interface, the communication interface configured to maintain concurrent communication with the first mobile device and the second mobile device;
        detect a first call at the first mobile device;
        in response to detecting the first call at the first mobile device, connect the microphone and the speaker to the first mobile device via the communication interface to transmit and receive audio in a hands-free mode;
        detect a second call at the second mobile device;
        in response to detecting the second call at the second mobile device, output a first prompt for selection of whether to continue the first call through the communication interface in the hands-free mode;
        in response to receiving a first input indicating a selection of exiting the hands-free mode for the first call, disconnect the microphone and the speaker from the first mobile device; and
        connect the microphone and the speaker to the second mobile device via the communication interface to send and receive audio in the hands-free mode.

2. The system of claim 1, wherein the communication interface maintains concurrent communication with the first mobile device in response to disconnecting the microphone and the speaker from the first mobile device.

3. The system of claim 1, wherein the first prompt is presented at a user interface in the vehicle and wherein the first input is configured to be received at the user interface in the vehicle.

4. The system of claim 1, wherein connecting the microphone and the speaker to the second mobile device is in response to receiving a second input indicating a selection of entering the hands-free mode for the second call, the second input being received at a user interface in the vehicle.

5. The system of claim 1, wherein the controller is further configured to:
    in response to disconnecting the microphone and the speaker from the first mobile device, output a second prompt to determine whether the second call enters the hands-free mode at a user interface in the vehicle.

6. The system of claim 1, wherein the system further comprises a memory, the memory configured to track an order in which calls from the multiple mobile devices are detected in a table while the hands-free mode is in use.

7. The system of claim 1, wherein the hands-free mode enables the microphone and the speaker to send and receive audio from the multiple mobile devices via the communication interface.

8. The system of claim 1, wherein the controller is further configured to:
    pair a third mobile device to the communication interface, the communication interface configured to maintain concurrent communication with the first mobile device, the second mobile device, and the third mobile device;
    detect a third call at the third mobile device;
    in response to detecting a third call at the third mobile device, output a third prompt for selection of whether to continue the second call through the communication interface in the hands-free mode;
    in response to receiving a third input indicating a selection of continuing the hands-free mode for the second call, monitor the second call to determine whether the second call is connected to the microphone and the speaker in hands-free mode; and
    in response to determining the second call is disconnected from the microphone and the speaker in the hands-free mode, connect the microphone and the speaker to the third mobile device via the communication interface to send and receive audio in the hands-free mode.

9. The system of claim 8, wherein connecting the microphone and the speaker to the third mobile device is in response to receiving the third input indicating a selection of entering the hands-free mode for the third call, the third input being received at a user interface in the vehicle.

10. The system of claim 8, wherein the controller is further configured to:
in response to determining the second call is disconnected from the microphone and the speaker in the hands-free mode, output a fourth prompt to determine whether the third call enters the hands-free mode at a user interface in the vehicle.

11. The system of claim 1, wherein the controller is further configured to determine whether the multiple mobile devices are in at least one of a standby mode, receiving an incoming call, making an outgoing call, and ready for a call connection.

12. The system of claim 1, wherein the first call at the first mobile device is at least one of a first inbound call and a first outbound call.

13. A non-transitory computer-readable storage medium storing instructions that, when executed by a processor, cause the processor to perform operations comprising:
pair a first mobile device of multiple mobile devices and a second mobile device of the multiple mobile devices to a communication interface, the communication interface configured to maintain concurrent communication with the first mobile device and the second mobile device;
detect a first call at the first mobile device;
in response to detecting the first call at the first mobile device, connect a microphone and a speaker to the first mobile device via the communication interface to transmit and receive audio in a hands-free mode;
detect a second call at the second mobile device;
in response to detecting the second call at the second mobile device, output a first prompt for selection of whether to continue the first call through the communication interface in the hands-free mode;
in response to receiving a first input indicating a selection of exiting the hands-free mode for the first call, disconnect the microphone and the speaker from the first mobile device; and
connect the microphone and the speaker to the second mobile device via the communication interface to send and receive audio in the hands-free mode.

14. The non-transitory computer-readable storage medium of claim 13, wherein the communication interface maintains concurrent communication with the first mobile device in response to disconnecting the microphone and the speaker from the first mobile device.

15. The non-transitory computer-readable storage medium of claim 13, wherein the first prompt is presented at a user interface in a vehicle and wherein the first input is configured to be received at the user interface in the vehicle.

16. The non-transitory computer-readable storage medium of claim 13, wherein connecting the microphone and the speaker to the second mobile device is in response to receiving a second input indicating a selection of entering the hands-free mode for the second call, the second input being received at a user interface in a vehicle.

17. The non-transitory computer-readable storage medium of claim 13, wherein the operations further comprise:
in response to disconnecting the microphone and the speaker from the first mobile device, output a second prompt to determine whether the second call enters the hands-free mode at a user interface in a vehicle.

18. The non-transitory computer-readable storage medium of claim 13, wherein the operations further comprise:
track an order in which calls from the multiple mobile devices are detected in a table while the hands-free mode is in use.

19. The non-transitory computer-readable storage medium of claim 13, wherein the hands-free mode enables the microphone and the speaker to send and receive audio from the multiple mobile devices via the communication interface.

20. A method for coordinating multiple calls across multiple mobile devices in a vehicle, the method comprising:
pair a first mobile device of multiple mobile devices and a second mobile device of the multiple mobile devices to a communication interface, the communication interface configured to maintain concurrent communication with the first mobile device and the second mobile device;
detect a first call at the first mobile device;
in response to detecting the first call at the first mobile device, connect a microphone and a speaker to the first mobile device via the communication interface to transmit and receive audio in a hands-free mode;
detect a second call at the second mobile device;
in response to detecting the second call at the second mobile device, output a first prompt for selection of whether to continue the first call through the communication interface in the hands-free mode;
in response to receiving a first input indicating a selection of exiting the hands-free mode for the first call, disconnect the microphone and the speaker from the first mobile device; and
connect the microphone and the speaker to the second mobile device via the communication interface to send and receive audio in the hands-free mode.

* * * * *